US012011843B1

(12) United States Patent
Talbott

(10) Patent No.: US 12,011,843 B1
(45) Date of Patent: Jun. 18, 2024

(54) TILE CUTTER

(71) Applicant: Harry Eugene Talbott, Powell, OH (US)

(72) Inventor: Harry Eugene Talbott, Powell, OH (US)

( * ) Notice: Subject to any disclaimer, the term of this patent is extended or adjusted under 35 U.S.C. 154(b) by 0 days.

(21) Appl. No.: 17/393,339

(22) Filed: Aug. 3, 2021

Related U.S. Application Data

(63) Continuation-in-part of application No. 16/141,958, filed on Sep. 25, 2018, now Pat. No. 11,077,576.

(60) Provisional application No. 62/563,102, filed on Sep. 26, 2017.

(51) Int. Cl.
*B26D 7/10* (2006.01)
*B26D 1/15* (2006.01)
*B26D 7/01* (2006.01)
*B26D 7/22* (2006.01)

(52) U.S. Cl.
CPC ............... *B26D 7/10* (2013.01); *B26D 1/151* (2013.01); *B26D 7/015* (2013.01); *B26D 7/22* (2013.01)

(58) Field of Classification Search
CPC .......... B26D 7/015; B26D 7/10; B26D 1/151; B26D 7/22
USPC .. 83/15–16, 425.2, 425.3, 425.4, 508.3, 170
See application file for complete search history.

(56) References Cited

U.S. PATENT DOCUMENTS 2,566,586 A * 9/1951 Soell ........................ A23G 3/08 83/563
2,622,680 A * 12/1952 Yakubik .................. E04F 21/20 83/15
2,713,108 A * 7/1955 Hearn .................. B26D 7/0006 219/521
3,522,753 A * 8/1970 Artur ....................... B26D 1/38 83/483
3,967,519 A * 7/1976 Esterly .................. B26F 1/3853 83/486.1
4,120,220 A * 10/1978 Mullen ................... C03B 33/04 83/648
4,354,410 A * 10/1982 Stubbings ................ B26D 3/10 83/486.1
4,419,820 A * 12/1983 Stumpf ................ B26F 1/3813 D15/127
4,437,376 A * 3/1984 Flint ...................... B28D 1/225 83/881
4,939,968 A * 7/1990 Stoof ...................... C03B 33/12 83/882
5,033,346 A * 7/1991 Kozyrski ............. B26F 1/3846 83/559

(Continued)

FOREIGN PATENT DOCUMENTS

DE 1336457 A2 * 9/2003 ............... B26D 1/18

*Primary Examiner* — Ghassem Alie

(74) *Attorney, Agent, or Firm* — Robert R. Lech; Lech Law, LLC

(57) ABSTRACT

Vinyl tile cutting devices are described herein. The described tile cutting devices include a base element. The base element is configured to support a tile thereon. The described tile cutting devices further include a cutting assembly. The cutting assembly includes a rotatable cutting blade for cutting said tile along an arc. In some embodiments, the cutting assembly includes an adjustment mechanism for changing the radius of the arc. The vinyl tile cutting device further includes a heating element. The heating element is configured to heat said tile prior to the cutting of said tile.

16 Claims, 19 Drawing Sheets

(56) References Cited

U.S. PATENT DOCUMENTS

| | | | | |
|---|---|---|---|---|
| 5,188,013 | A * | 2/1993 | Cardinale ............... | B26F 3/002 33/527 |
| 6,118,101 | A * | 9/2000 | Choboter .............. | E04F 15/105 219/395 |
| 6,427,677 | B1 * | 8/2002 | O'Banion ............ | B23D 45/027 125/35 |

* cited by examiner

Detail "A"

TILE CUTTER

CROSS-REFERENCE TO RELATED APPLICATIONS

This application is a continuation-in-part of prior application Ser. No. 16/141,958, filed on Sep. 23, 2018 and entitled "Tile Cutting Device", which claimed priority to U.S. Provisional Patent Application Ser. No. 62/563,102 filed Sep. 26, 2017 entitled "Tile Cutting Device." Said applications are hereby incorporated by reference in their entirety as if fully set forth herein.

STATEMENT REGARDING FEDERALLY SPONSORED RESEARCH OR DEVELOPMENT

Not Applicable.

NAMES OF THE PARTIES TO A JOINT RESEARCH AGREEMENT

Not Applicable.

INCORPORATION BY REFERENCE OF MATERIAL SUBMITTED ON A COMPACT DISK

Not Applicable.

BACKGROUND OF THE INVENTION

Technical Field

The present invention generally relates to cutting devices. More particularly, the present invention relates to cutting devices for cutting tiles in a generally linear manner.

Background and Description of Related Art

Vinyl composition tile (VCT) is a widely used flooring system for both residential and commercial buildings because of its durability and cleanability. VCT is typically furnished in twelve inch by twelve inch (12"×12") squares, and is often installed in different, alternating directions. Also, different colors of tile squares are sometimes utilized in a building floor so as to avoid the monotony resulting from a floor having only a single color and pattern.

Conventional tile cutters, which are used for cutting vinyl composition tile, are generally only capable of cutting a single piece of tile at a time. Thus, when it is necessary to cut multiple pieces of tile of the same shape in a consecutive manner, a cutting guide, which is typically provided on these conventional tile cutters, is set to a particular position. Then, multiple pieces of tile are cut to the same shape while the cutting guide is left in its set position. However, even cutting a tile in half is extremely difficult with these conventional tile cutters because tiles are typically dense and brittle, making them difficult to cut properly. It is virtually impossible, and not cost effective for the tile installer, to use these conventional tile cutters for non-standard tile cutting patterns, such as cutting the tile at 90 degree, 45 degree, and 22½ degree angles.

Therefore, there is a need for a tile cutting device that is capable of cutting flooring tile with increased accuracy and ease-of-use. Moreover, there is a need for a tile cutting device that is capable of accurately cutting non-standard tile cutting patterns, such as cutting the tile at 90 degree, 45 degree, and 22½ degree angles. Furthermore, there is a need for a tile cutting device that makes the tile easier to cut through, such as by heating the tile prior to the cutting thereof.

SUMMARY OF EXAMPLE EMBODIMENTS

Accordingly, the present invention is directed to an improved tile cutting device that substantially obviates one or more problems resulting from the limitations and deficiencies of the related art.

According to a first embodiment of the present application, Applicant discloses a vinyl tile cutting device configured to cut vinyl tiles along an arc. The vinyl tile cutting device comprises: a base element, a cutting assembly, and a heating element. The base element is conductive and configured to support a vinyl tile thereon during a cutting process. The vinyl tile has at least one curved cutting path.

The cutting assembly is disposed above said base element, and the cutting assembly comprises a non-motorized, toothless, rotatable cutting blade for cutting said vinyl tile in a generally curved cutting path. The heating element is disposed beneath said base element and substantially spans the path of said cutting assembly. The heating element is configured to adjustably heat the cutting path of the vinyl tile prior to and contemporaneous with the cutting of the vinyl tile.

The vinyl tile cutting device may comprise a plurality of cutting assemblies, each comprising a non-motorized, toothless, rotatable cutting blade for cutting said vinyl tile in a respective plurality of generally curved cutting paths.

The base element of the vinyl tile cutting device may comprise a pair of spaced-apart rails for supporting said cutting assemblies.

The cutting assembly of the vinyl tile cutting device may further include a safety cover disposed over at least a portion of the cutting blade so as to protect a user of the tile cutting device from being inadvertently cut by the cutting blade.

The base element of the vinyl tile cutting device may include one or more securing elements for holding said tile in place relative to the base element.

The cutting assembly of the vinyl tile cutting device further comprises a rail guide which engages one of the pair of spaced apart rails. The rail guide supports an articulated arm which supports the cutting blade. The articulated arm is configured to rotate with respect to the rail guide.

The articulated arm of the vinyl tile cutting device comprises an adjustment mechanism operative to change a radius of the cutting path.

According to a second embodiment of the present application, Applicant discloses a vinyl tile cutting device configured to cut arcs in vinyl tiles. The vinyl tile cutting device comprises: a base, a plurality of cutting assemblies, and a heating element. The base element is conductive and configured to support a vinyl tile thereon during a cutting process. The base element comprises a pair of spaced-apart rails.

The plurality of cutting assemblies is disposed above the base element. Each cutting assembly comprises a rail guide, and each rail guide engages one of the pair of spaced apart rails. Each rail guide supports an articulated arm which supports a cutting blade. Each articulated arm is configured to rotate with respect to the respective rail guide.

The heating element is disposed beneath said base element and substantially spans a cutting path of each cutting assembly. The heating element is configured to adjustably heat the cutting paths of the vinyl tile prior to and contemporaneous with the cutting of the vinyl tile.

Each cutting assembly of the vinyl tile cutting device may include a safety cover disposed over at least a portion of the respective cutting blade so as to protect a user of said tile cutting device from being inadvertently cut by the cutting blade.

The base element of the vinyl tile cutting device may include one or more securing elements for holding said tile in place relative to said base element.

Each articulated arm of the vinyl tile cutting device may comprises an adjustment mechanism operative to change a radius of a respective cutting path of the respective cutting assembly.

BRIEF DESCRIPTION OF THE DRAWINGS

The invention will now be described, by way of example, with reference to the accompanying drawings, which are incorporated in and constitute a part of the specification, in which.

DRAWING REFERENCE NUMERALS

Figure 1:
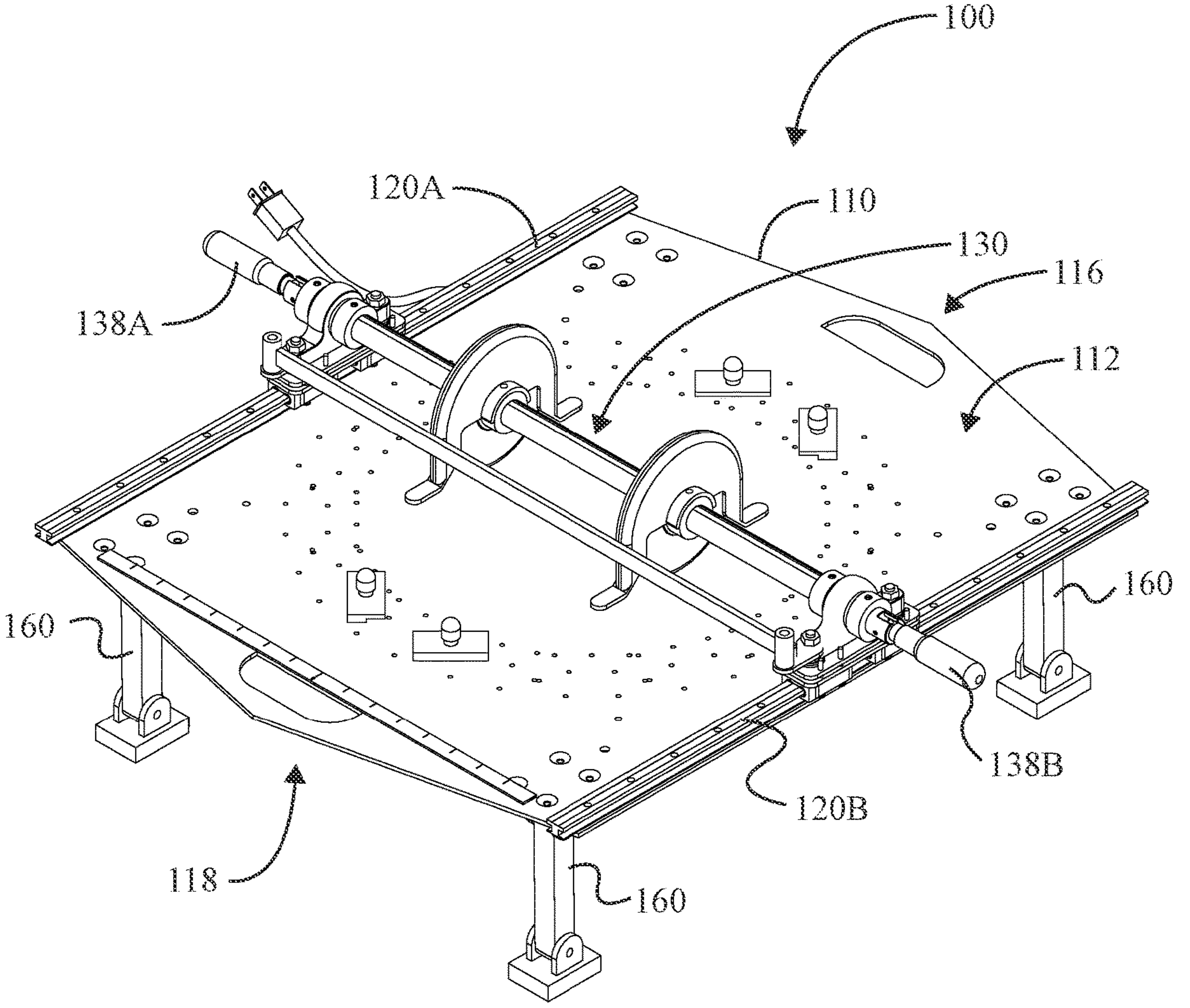
FIG. 1 is an orthographic top view of a first example tile cutting device.

The following reference characters identify the associated elements depicted in the drawings describing the present invention:

| | | | |
|---|---|---|---|
| 100 | First Example Tile Cutting Device | 900 | User |
| 102 | Tile | 1700 | Hot Tile Mover |
| 110 | Base Element | 1702 | Handle |
| 112 | Top Surface | 1704 | Frame |
| 114 | Bottom Surface | 1706 | Suction Cup |
| 116 | Rear Handle | 1900 | Second Example Tile Cutting Device |
| 118 | Front Handle | 1902A | Cutting Assembly |
| 120A | Left Rail | 1902B | Cutting Assembly |
| 120B | Right Rail | 1910B | Rail Guide |
| 122 | Ruler | 1912B | Angled Connector |
| 130 | Cutting Assembly | 1914B | Fastener |
| 132 | Axial Support | 1916B | Adjustable Arm |
| 134 | Blade | 1918B | Cutting Blade |
| 136 | Guard | 1920B | Blade Guard |
| 138A | Left Handle | 1930 | Tile |
| 138B | Right Handle | 1940A | Arc |
| 140A | Left Rail Guide | 1940B | Arc |
| 140B | Right Rail Guide | 1950 | Arc |
| 142 | Guard Support | 1960A | Arc |
| 150 | Securing Element | 1960B | Arc |
| 160 | Support Leg | 1932A | Tile showing proposed cuts |
| 170 | Heating Element | 1932B | Tile Portions |

DETAILED DESCRIPTION

To address the deficiencies of the prior art, the present application discloses an improved tile cutting device. The tile cutting device of the present application embodies several improvements over the prior art. According to one aspect of the present application, the disclosed tile cutter may comprise a heating element for heating a tile during cutting to make cutting the tile easier. According to another aspect of the present application, the disclosed tile cutter may comprise a plurality of spaced-apart rotatable cutting blades for cutting the tile in a generally linear manner.

Figure 2:
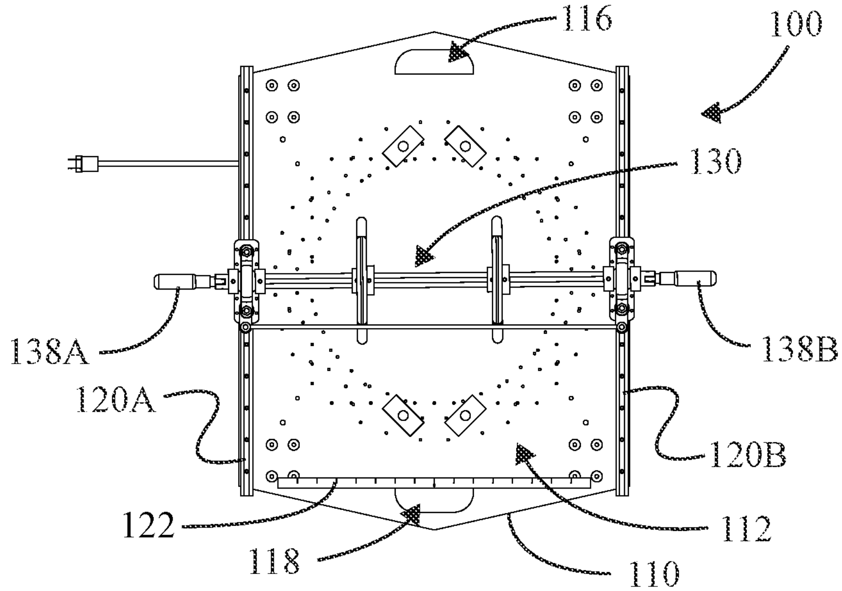
FIG. 2 is a top plan view of the first example tile cutting device.

Referring now to FIGS. 1 and 2, there is shown an orthographic view of an example tile cutting device 100. Example tile cutting device 100 comprises a base element 110 having an upper surface 112 for supporting a tile to be cut. As illustrated, base element 110 may form one or more handles, such as for example front handle 118 and rear handle 116, for moving, adjusting and/or carrying device 100.

Example tile cutting device 100 further comprises a cutting assembly 130 for performing the cutting operation. Cutting assembly 130 is supported by and movable along two rails, left rail 120A and right rail 120B. Cutting assembly 130 includes a left handle 138A and a right handle 138B which may be grasped by a user to move the cutting assembly to and fro along rails 120A and 120B. In the illustrative embodiment, the handles 138A and 138B pivot between the operative positions of FIG. 1 and the stowed positions of FIG. 14. A ruler 122 is disposed along the front of the upper cutting surface 112. Base element 110 and cutting assembly 130 are supported by a plurality of support legs 160. In the example tile cutting device 100, each of the support legs 160 is collapsible so as to make the tile cutting device 100 more compact for transporting the cutting device 100 (see FIG. 14).

Figure 3:
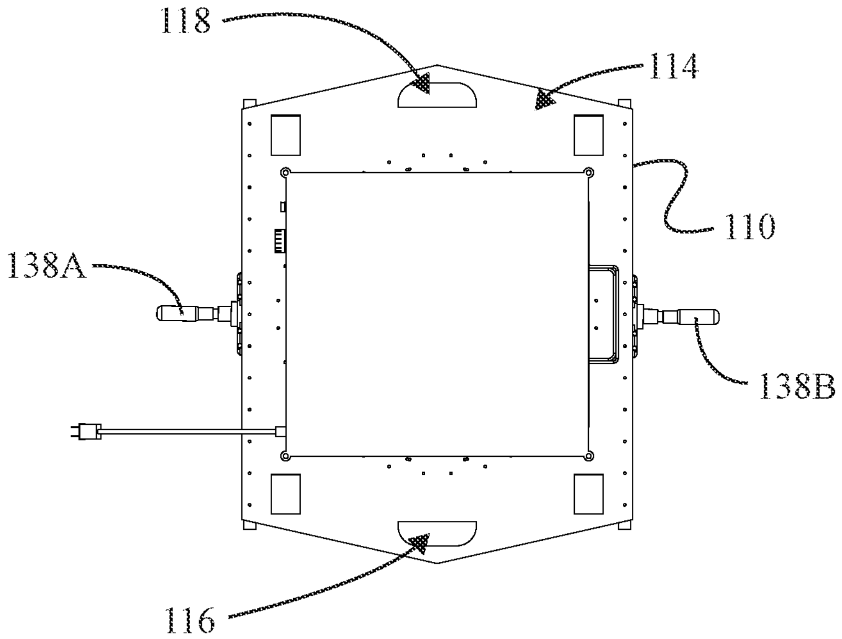
FIG. 3 is a bottom plan view of the first example tile cutting device.
Figure 4:
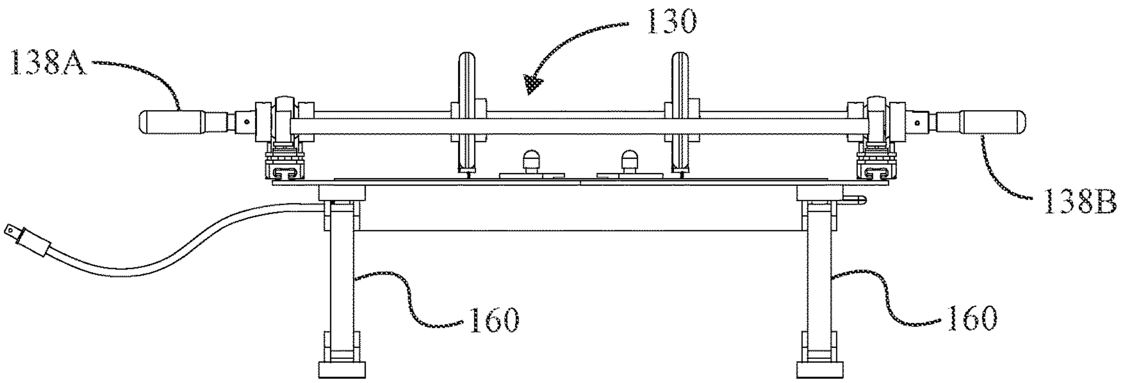
FIG. 4 is a front side view of the first example tile cutting device.
Figure 5:
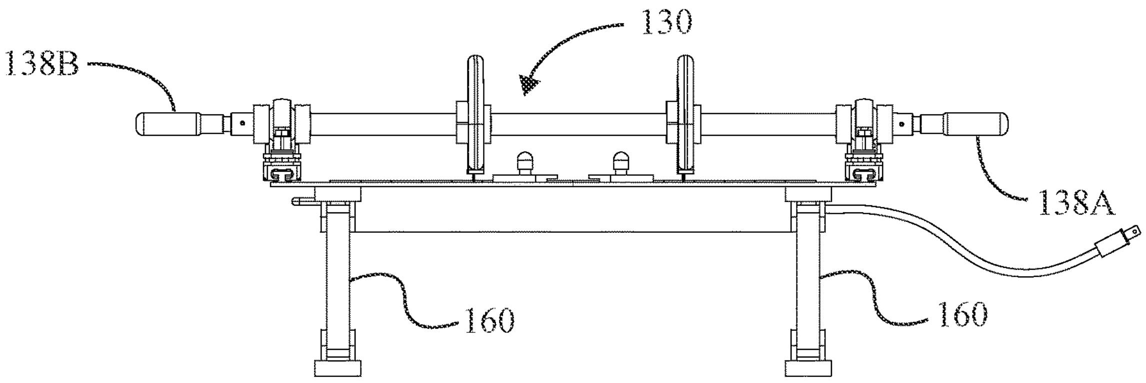
FIG. 5 is a rear side view of the first example tile cutting device.
Figure 6:
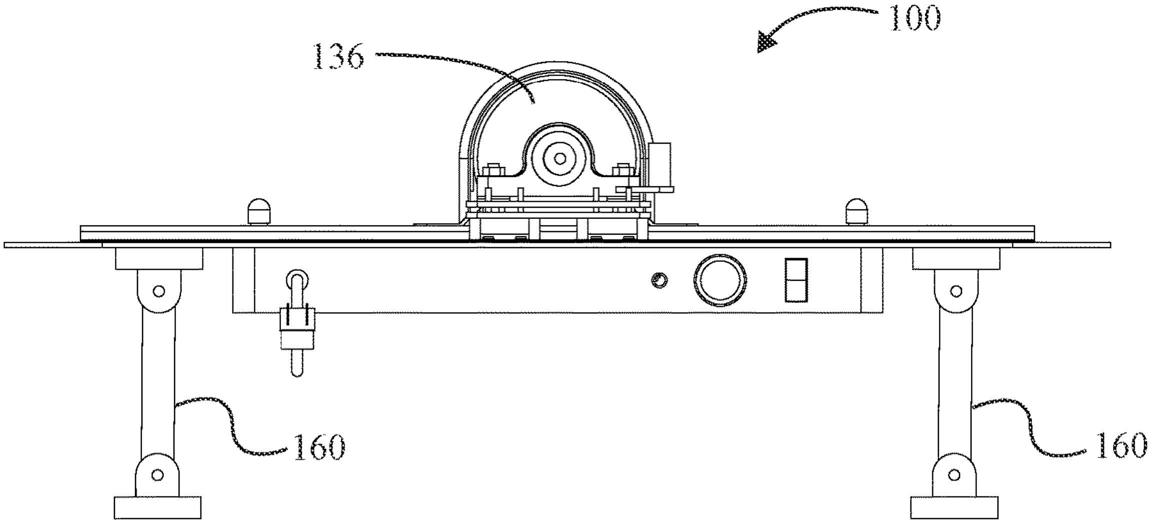
FIG. 6 is a left side view of the first example tile cutting device.
Figure 7:
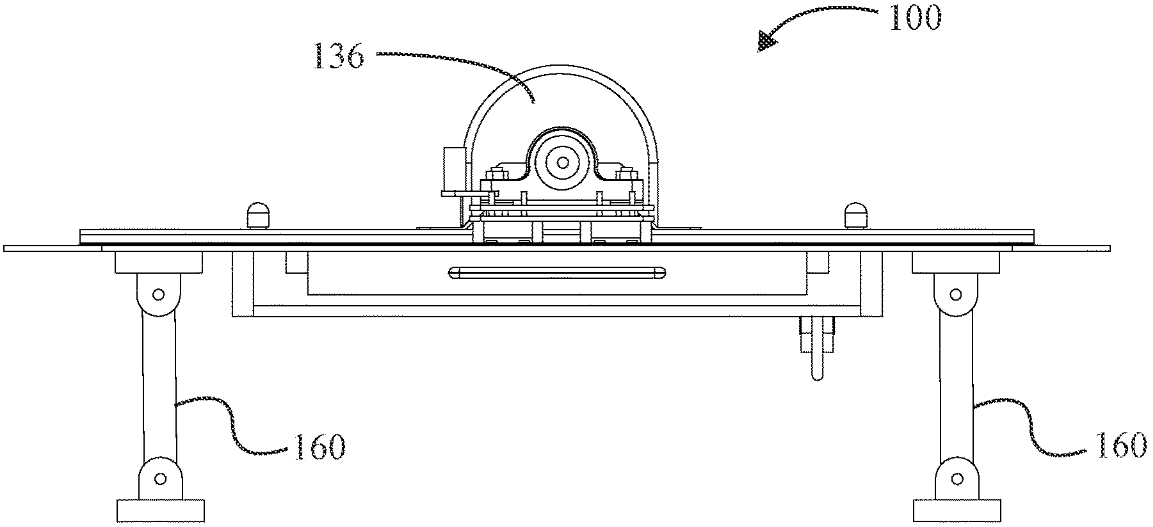
FIG. 7 is a right side view of the first example tile cutting device.

FIG. 3 depicts a bottom plan view of example cutting device 100. The bottom plan view illustrates a bottom surface 114 of base element 110 and a heating element 170 which is disposed beneath the base element 110 when cutting device 100 is properly oriented. Placement of heating element 170 beneath, and in close proximity to the bottom surface 114 of base element 110 enables heating element 170 to heat base element 110 which conducts the heat to the tile being cut. The front, rear, left and right views of FIGS. 4-7, respectively, also illustrate the relationship between heating element 170 and base element 110. As shown in the side view of FIG. 6, the illustrative heating element 170 comprises a temperature dial and a power switch proximate to one end thereof.

Figure 8:
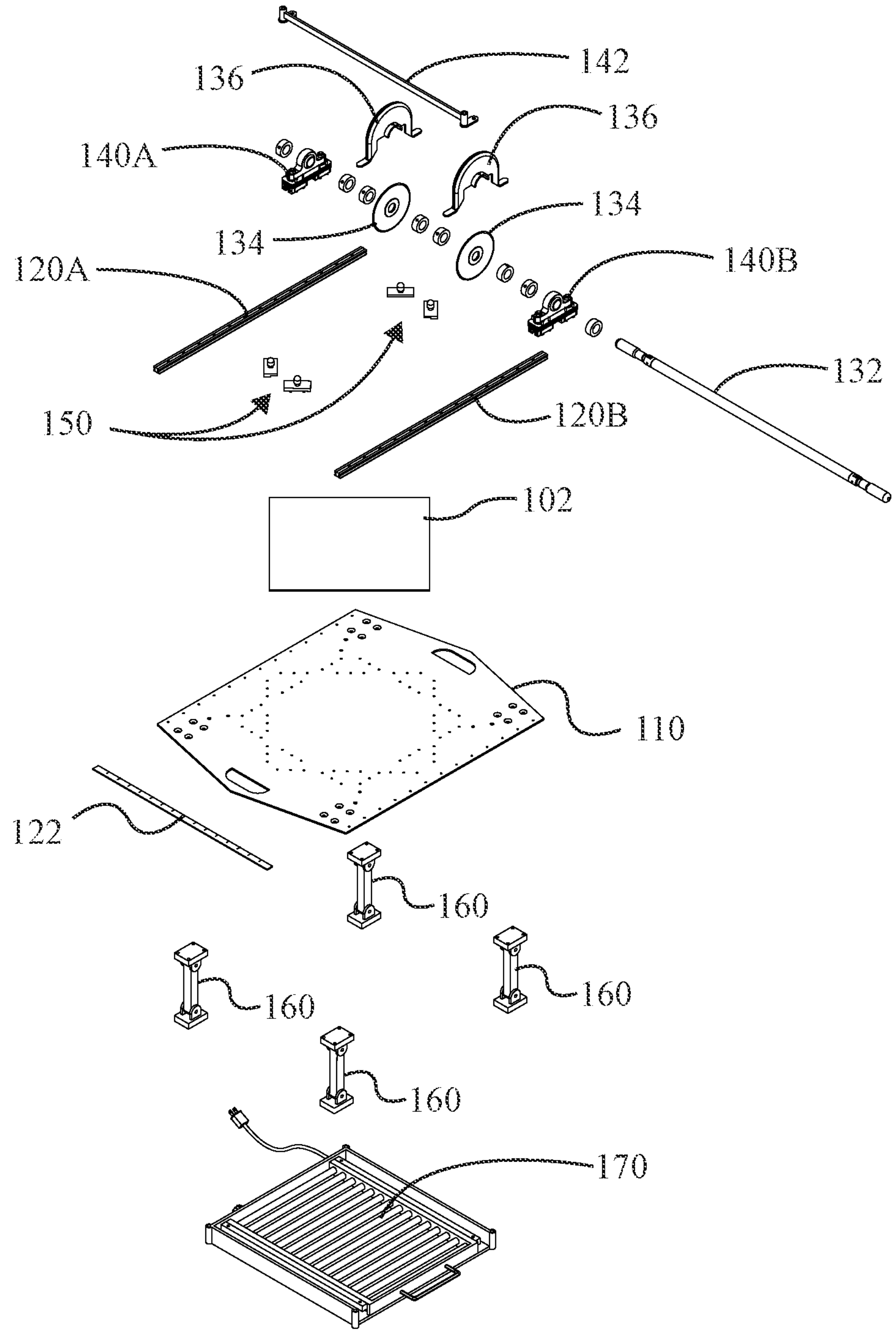
FIG. 8 is a 3D exploded view of the first example tile cutting device.

FIG. 8 depicts a 3D exploded view of the example tile cutting device 100. As illustrated, the example tile cutting device 100 comprises base element 110, rails 120A and 120B, and cutting assembly 130. Cutting assembly 130 includes axial support 132, left and right rail guides 140A and 140B, respectively, rotatable cutting blades 134, guard support 142 and guards 136. In operation, cutting blades 134 are adjustable along axial support 132. A user may employ ruler 122 to position each cutting blade 134 as desired. Cutting blades 134 are not required to be positioned symmetrically with respect to the center of ruler 122.

FIG. 8 further depicts support legs 160 and heating element 170. Finally, there is illustrated a tile 102 and a plurality of securing elements 150 for securing the tile 102 to the cutting device 100.

Figure 9:
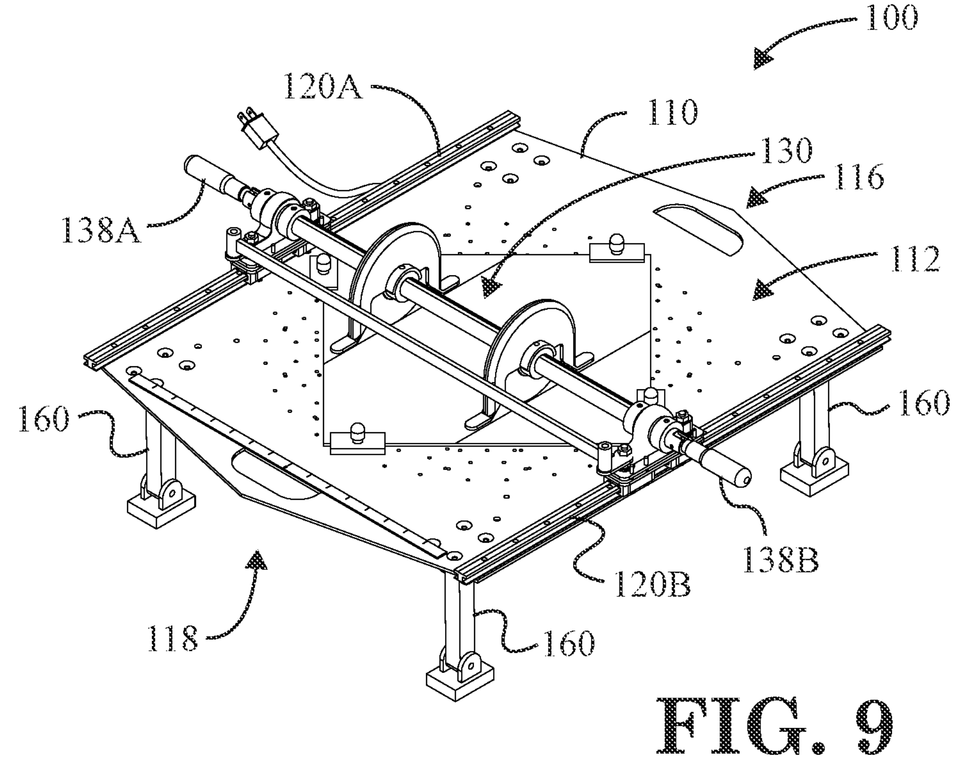
FIG. 9 is an orthographic view of the tile cutting device of FIG. 1 configured to cut a tile at a 45 degree angle.
Figure 10:
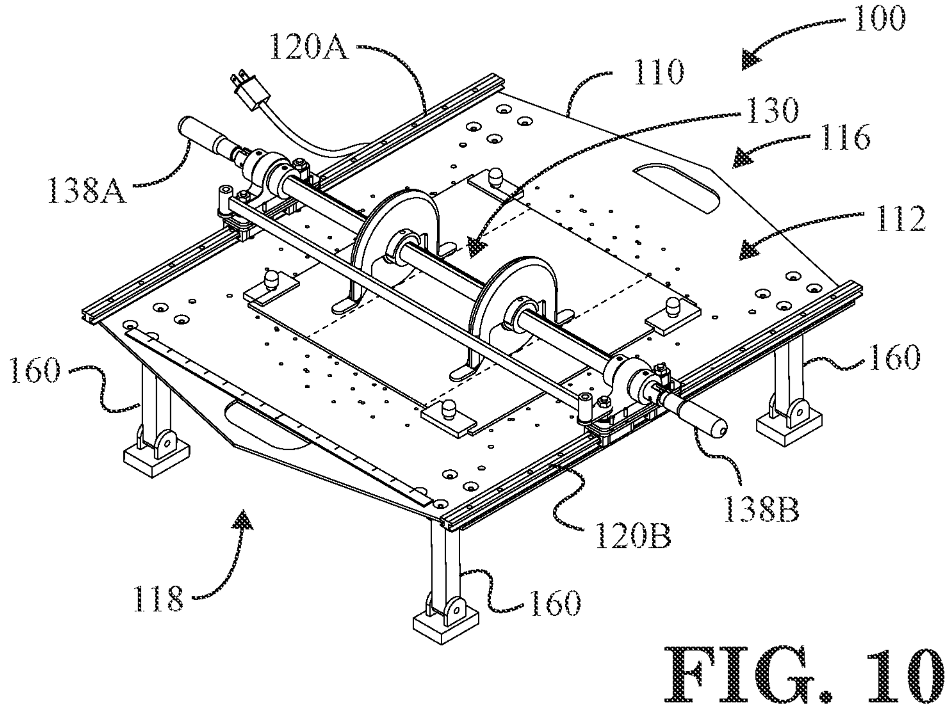
FIG. 10 is an orthographic view of the tile cutting device of FIG. 1 configured to cut a tile at a 90 degree angle.
Figure 11:
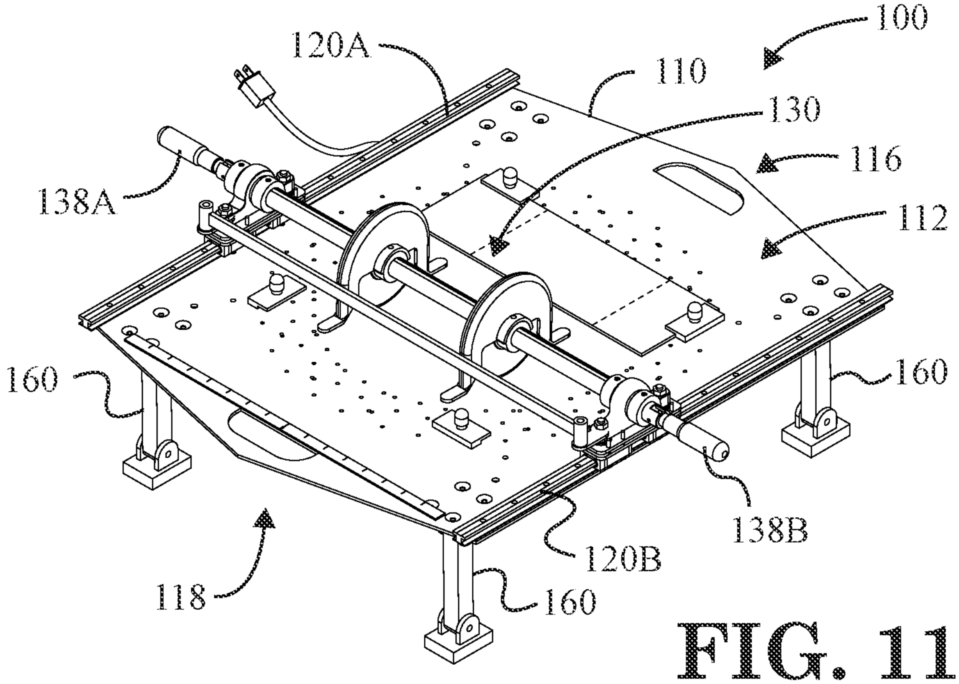
FIG. 11 is an orthographic view of the tile cutting device of FIG. 1 configured to cut a tile portion at a 90 degree angle.
Figure 12:
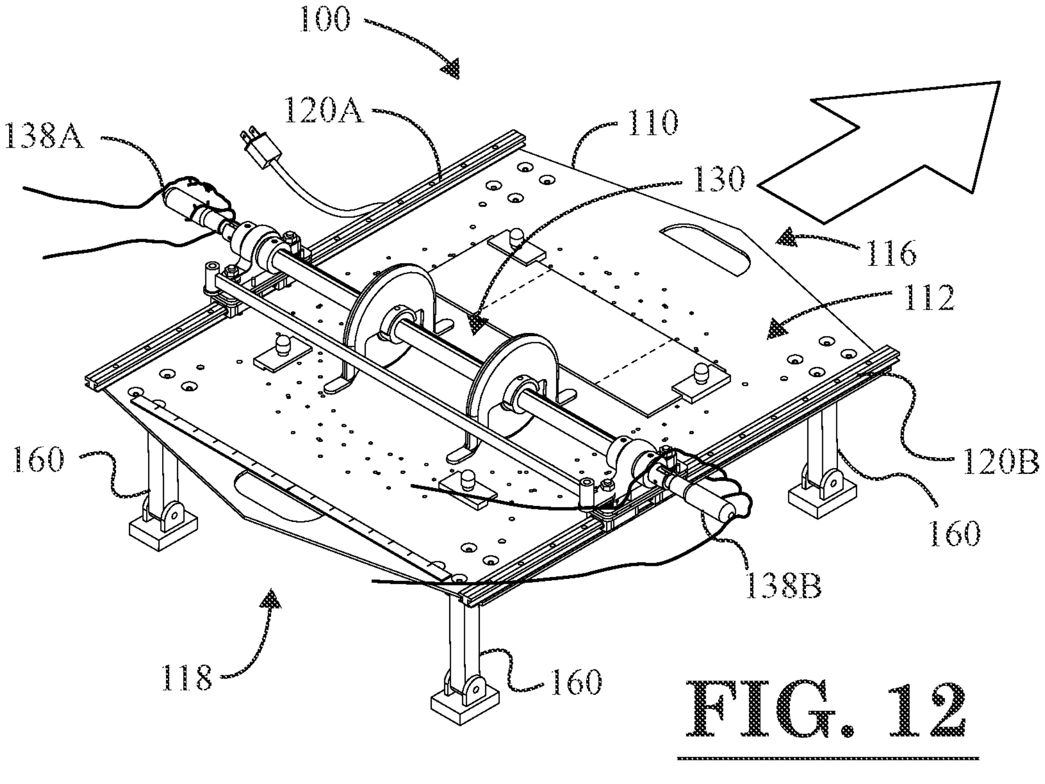
FIG. 12 is an orthographic view of the tile cutting device of FIG. 1 illustrating the user force required to cut a tile portion at a 90 degree angle.

FIG. 9 is an orthographic view of the example tile cutting device configured to cut a tile at a 45 degree angle. FIG. 10 is an orthographic view of the example tile cutting device configured to cut a tile at a 90 degree angle. FIG. 11 is an orthographic view of the example tile cutting device configured to cut a tile portion at a 90 degree angle. FIG. 12 is an orthographic view of the example tile cutting device illustrating a force required by a user to cut a tile portion at a 90 degree angle.

Figure 13A:
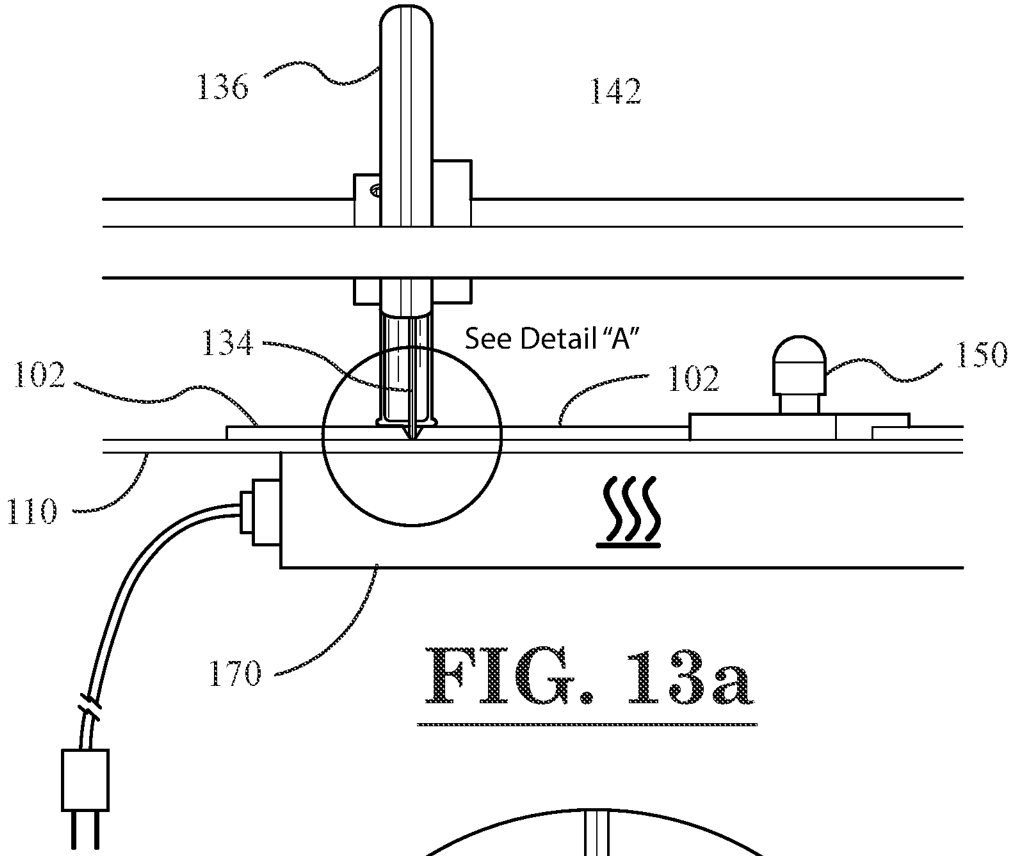
FIGS. 13*a* and 13*b* are magnified and detail front views of a portion of the cutting device during operation.
Figure 13B:
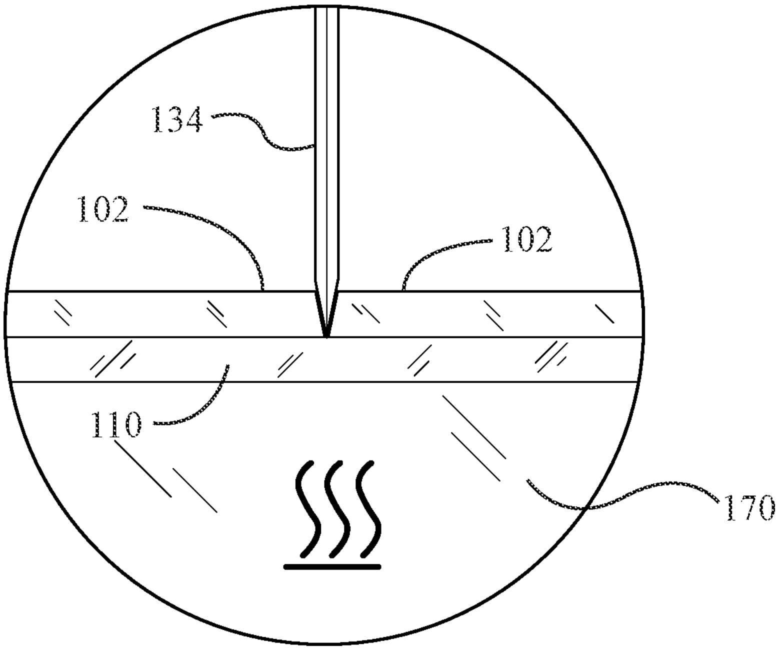

FIGS. 13*a* and 13*b* are magnified and detail front views of a portion of the cutting device during operation.

FIG. 13*a* is a magnified front view of a portion of the cutting device during operation. Specifically, FIG. 13*a* illustrates a tile 102 secured to base element 110 using securing element 150. One of the blades 134 is shown cutting tile 102. The blade 134 is suspended from axial support 132. Blade 134 is covered by guard 136 which is suspended from guard support 142. Guard support 142 additionally adds rigidity to the cutting assembly 130 so as to stabilize the cutting assembly 130 and prevent the cutting assembly 130 from jamming during the displacement of the blades 134 by a user. Heating element 170 is illustrated as radiating heat directly to base element 110 which, in turn, applies heat to tile 102 during the cutting operation. The cutting operation is even more clearly shown in FIG. 13*b*.

Figure 14:
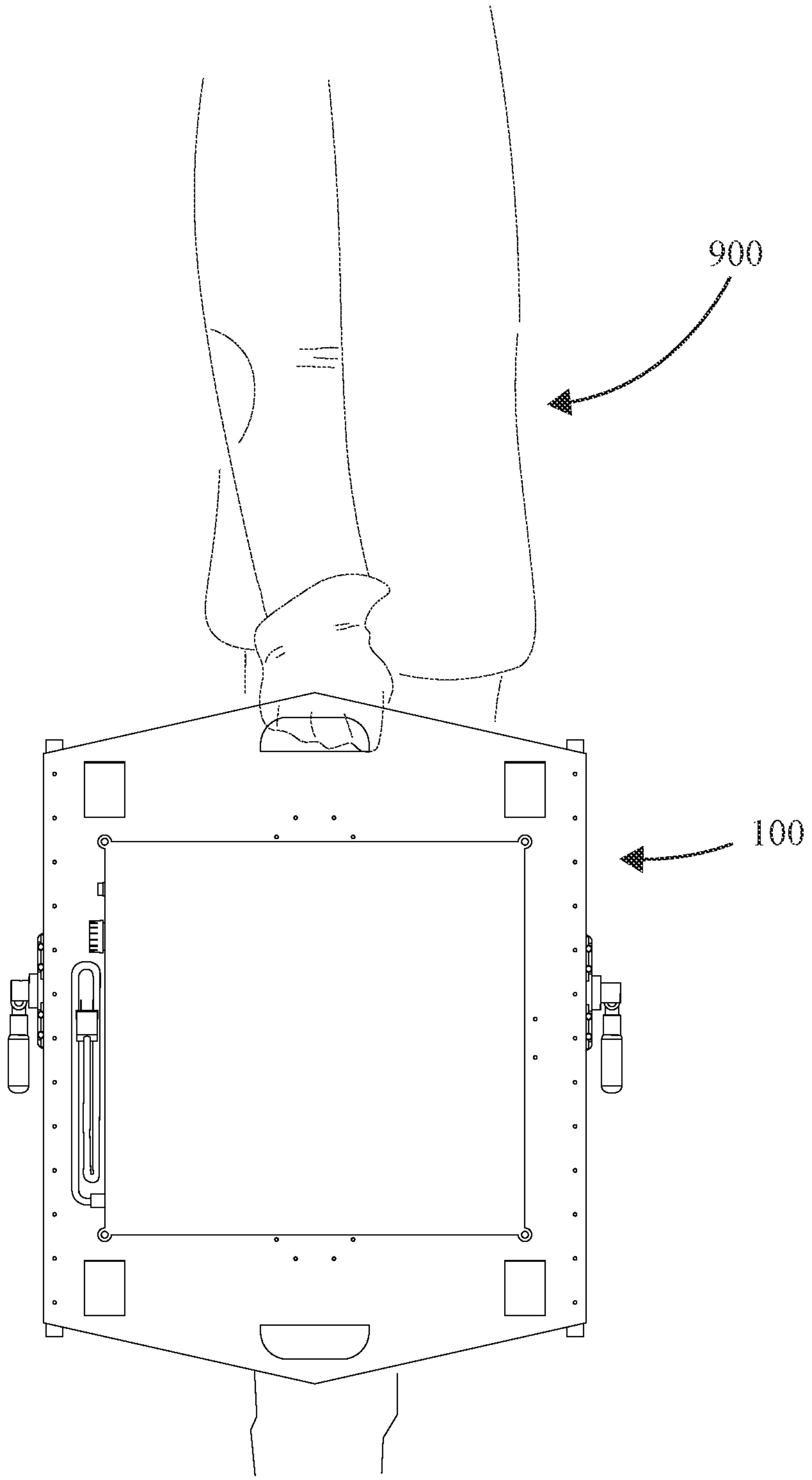
FIG. 14 is an orthographic view of the tile cutting device of FIG. 1 being transported by a user.

FIG. 14 is an orthographic view of tile cutting device being transported by a user 900. In FIG. 14, the handles 138A and 138B of the cutting assembly 130 been folded into their stowed positions to make the tile cutting device 100 more compact for transportation by the user 900.

Figure 15:
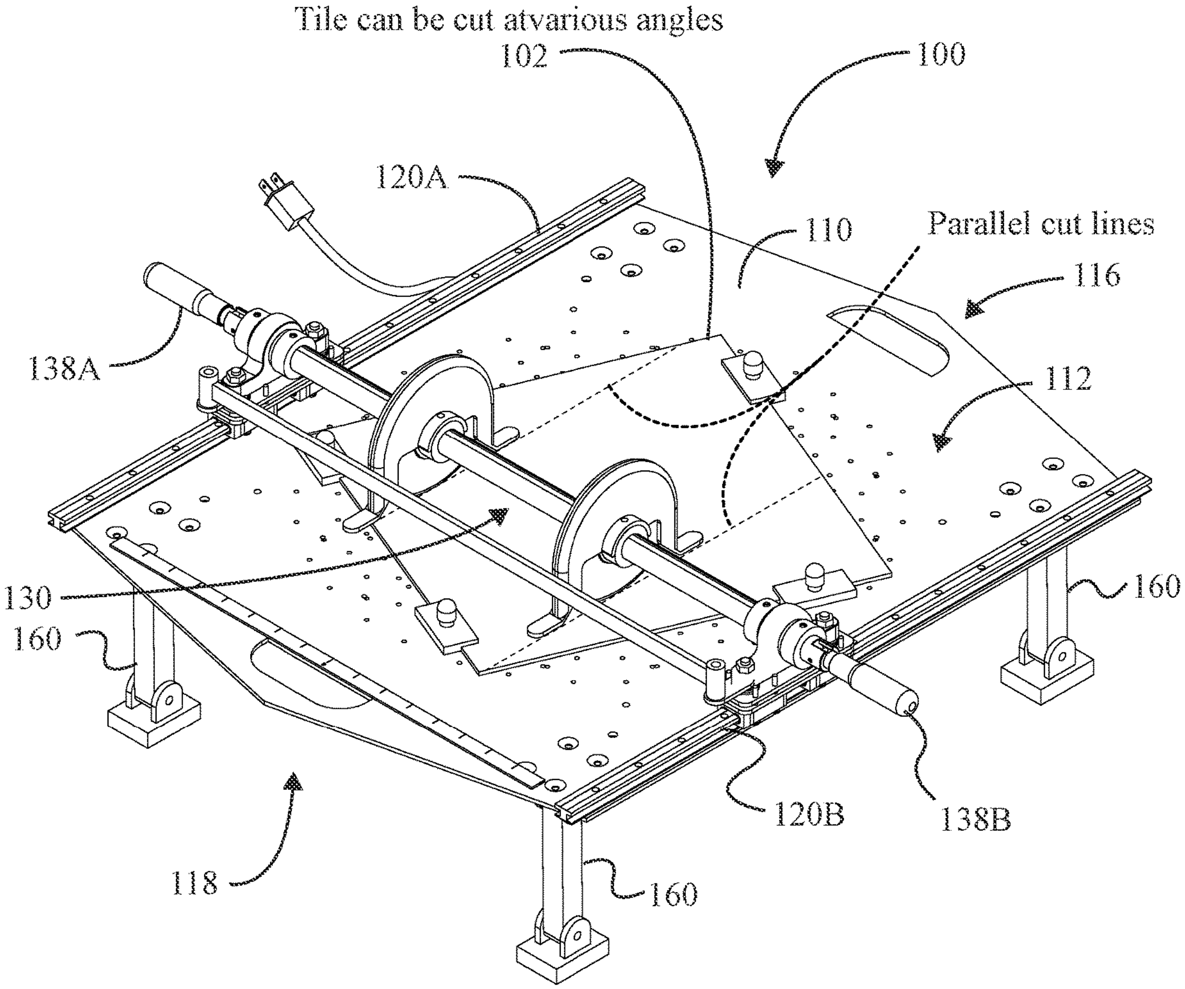
FIG. 15 is an orthographic view of the tile cutting device of FIG. 1 configured to cut a tile at a 22.5 degree angle.

FIG. 15 is an orthographic view of the example tile cutting device configured to cut a tile at a 22.5 degree angle.

Figure 16:
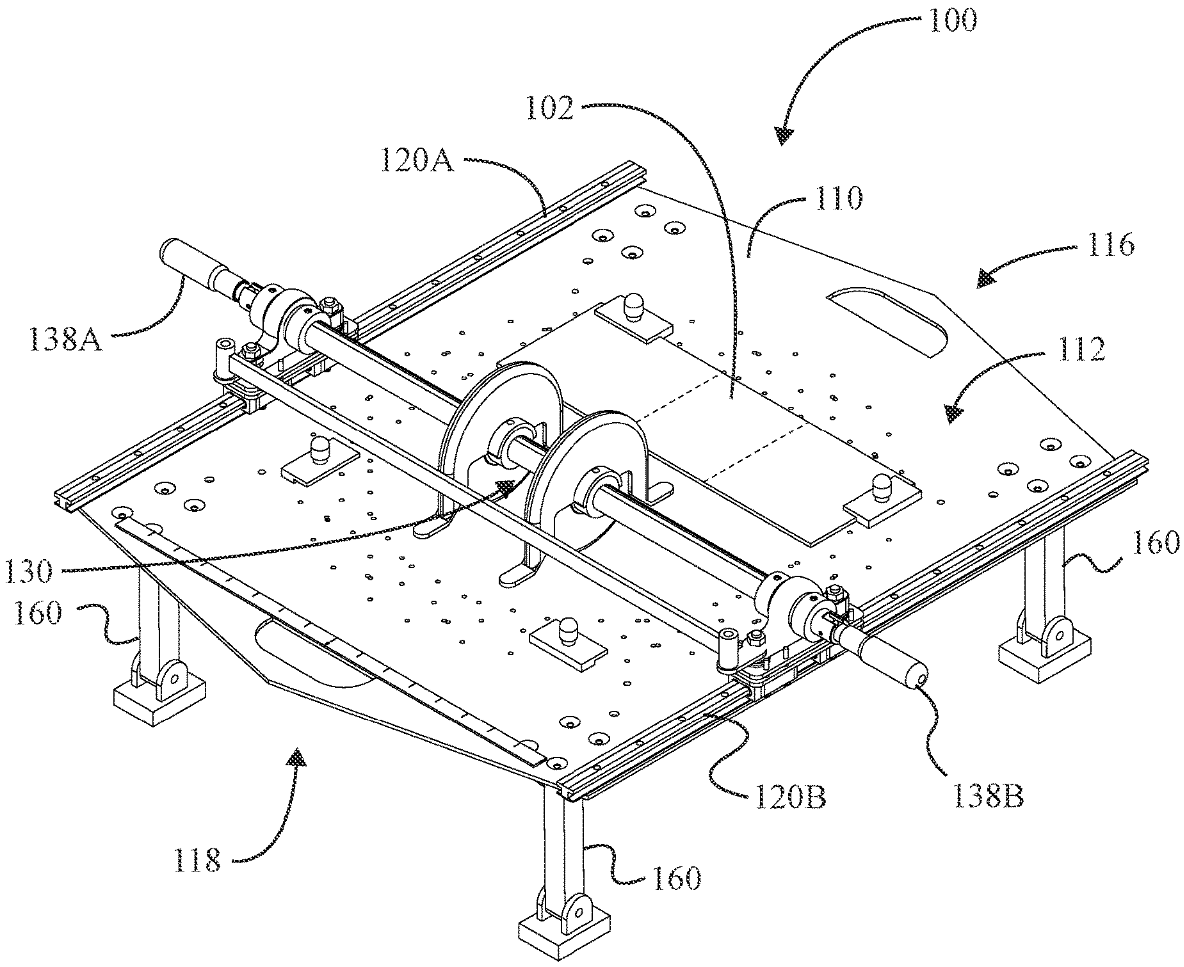
FIG. 16 is an orthographic view of the tile cutting device of FIG. 1 configured to cut a tile portion at a 90 degree angle.

FIG. 16 is an orthographic view of the example tile cutting device configured to cut a tile portion at a 90 degree angle. Note that the cutting blades 134 are positioned closer to the center than those shown in FIG. 12.

Figure 17:
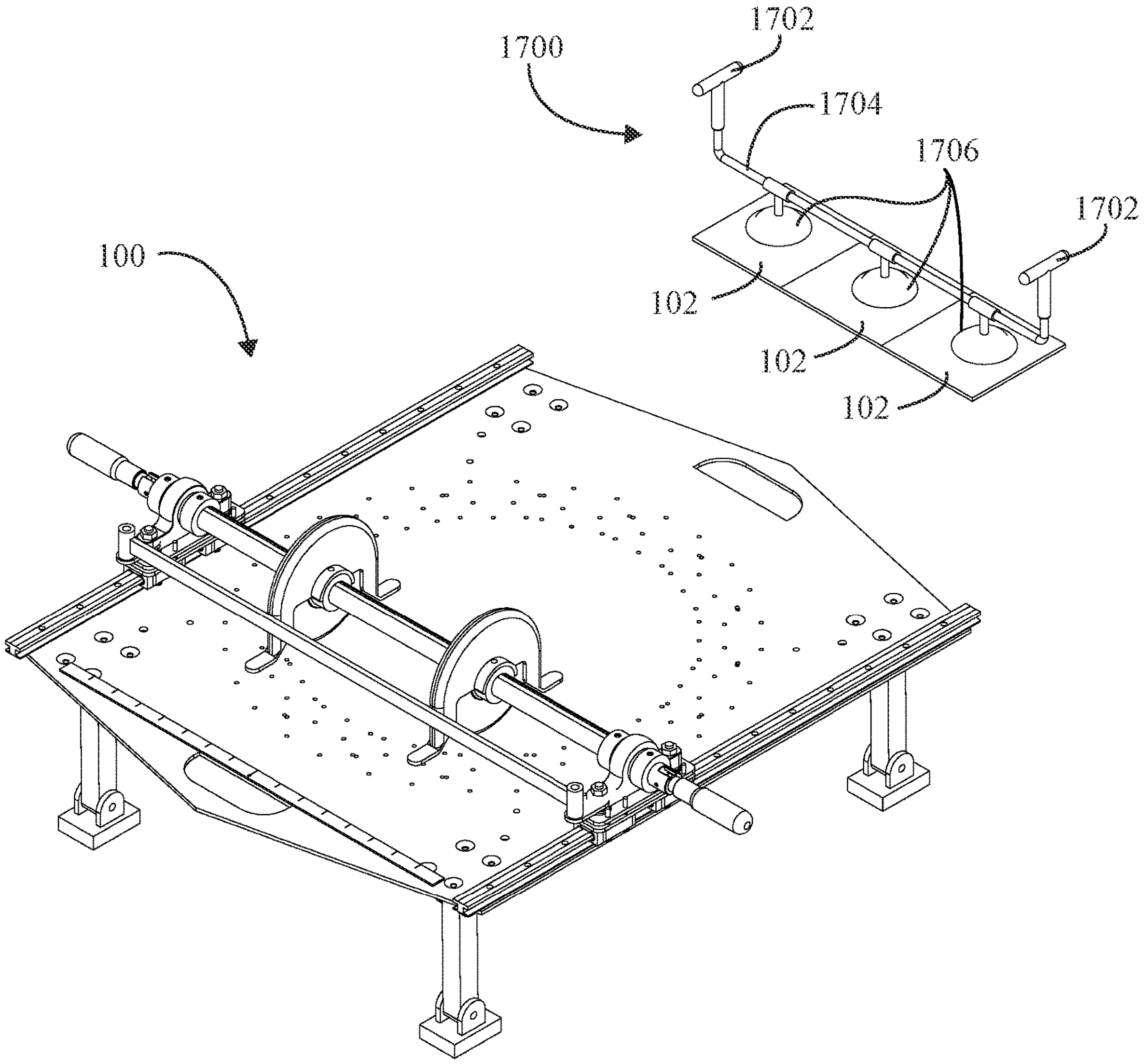
FIG. 17 is an orthographic view of the tile cutting device of FIG. 1 used in conjunction with a hot tile remover.

FIG. 17 is an orthographic view of the example tile cutting device used in conjunction with a hot tile remover 1700. Hot tile remover 1700 comprises a frame 1704 supported by a pair of handles 1702. Hot tile remover further comprises a plurality of suction cups 1706 which may each be independently positioned along frame 1704. Hot tile remover 1700 is depicted supporting three tiles 102 recently cut by cutting device 100.

Figure 18:
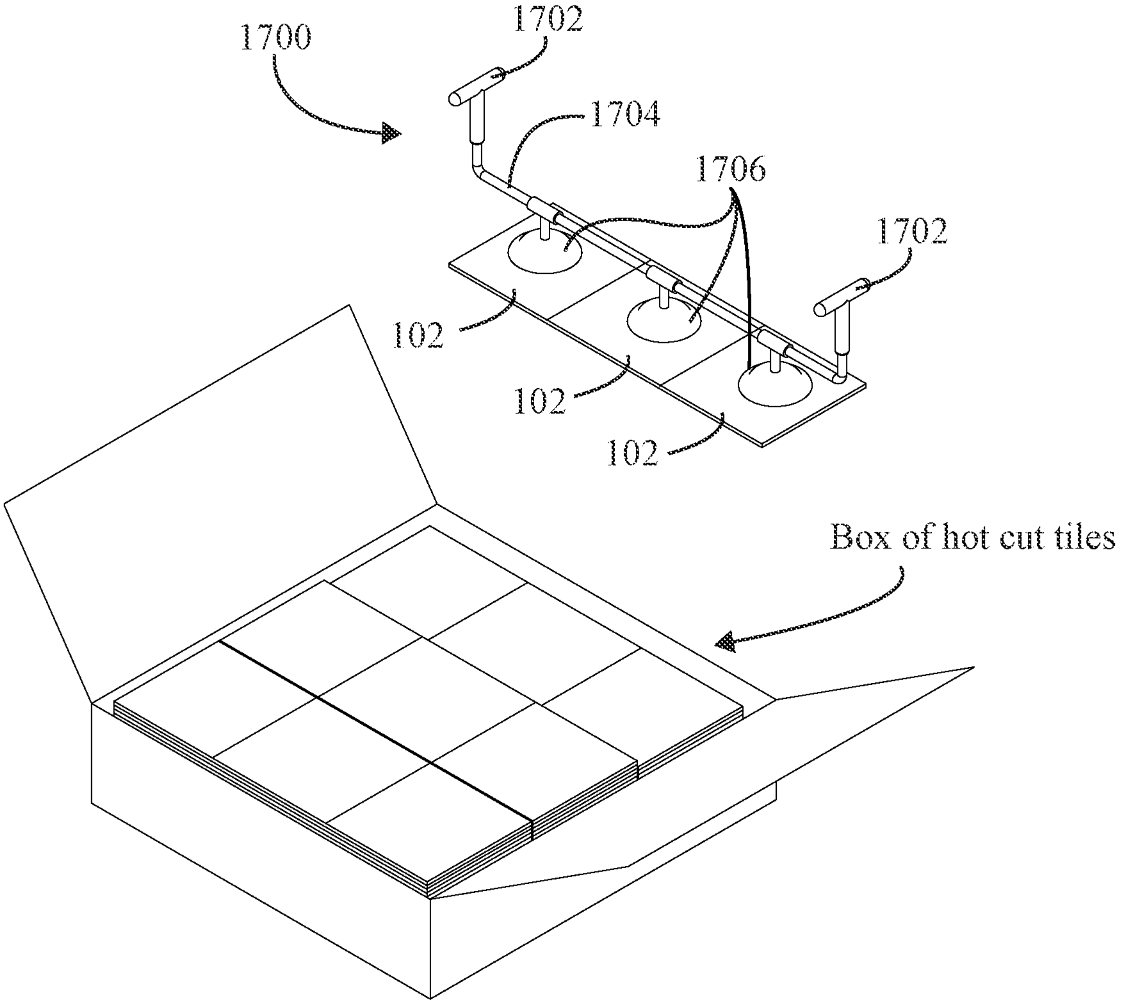
FIG. 18 is an environmental view of a box of cut tiles used in conjunction with the hot tile remover.

FIG. 18 is an environmental view of a box of cut tiles 102 used in conjunction with hot tile remover 1700.

Figure 19:
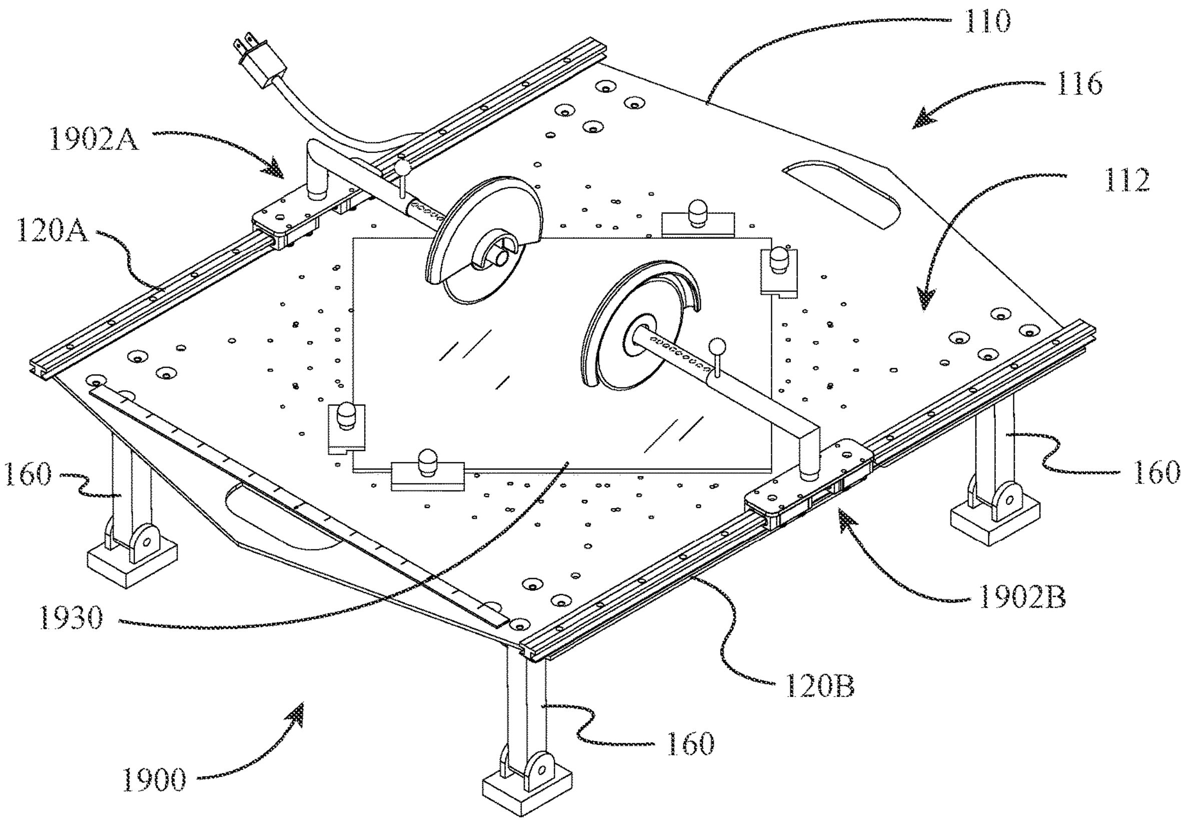
FIG. 19 is an orthographic top view of a second example tile cutting device.

Referring now to FIG. 19 there is shown an orthographic view of a second example tile cutting device 1900. Similar to the first example cutting device 100, described above, second example tile cutting device 1900 comprises base element 110 having an upper surface 112 for supporting a tile to be cut. As illustrated, base element 110 may form one or more handles, such as for example front handle 118 and rear handle 116, for moving, adjusting and/or carrying device 100. Second example tile cutting device 1900 comprises two cutting assemblies 1902A and 1902B that, unlike the cutting assembly described above, allows a tile to be cut along an arc.

Figure 20:
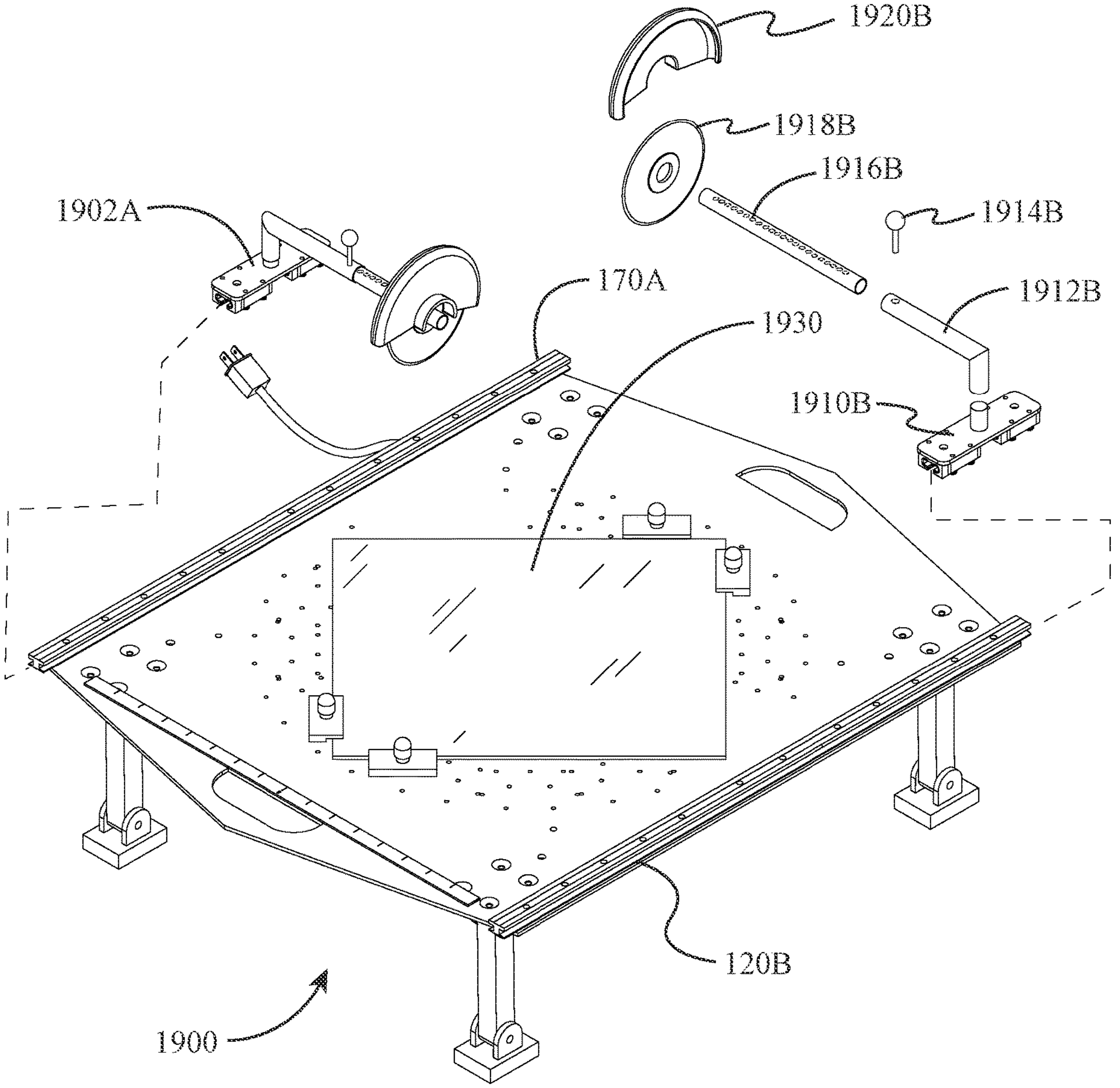
FIG. 20 is an exploded orthographic top view of the second example tile cutting device.

Referring now to FIG. 20, there is illustrated an exploded orthographic top view of the second example tile cutting device 1900. Specifically, the components of cutting assembly 1902B are illustrated in an exploded fashion. Cutting assembly 1902B comprises a rail guide 1910B, an angled connector 1912B, a fastener 1914B, an adjustable arm 1916B, a rotatable, non-motorized, cutting blade 1918B, and a blade guard 1920B.

Rail guide 1910B is operative to engage a side rail, such as rail 120B. Rail guide 1910B may be positioned and fixed at any location along rail 120B. Although rail guide 1910B is illustrated as engaging with rail 120B, it is also operative to instead engage with rail 120A. Rail guide 1910B supports angled connector 1912B which is configured to rotate with respect to rail guide 1910B.

Angled connector 1912B is connected to arm 1916B using fastener 1914B. Fastener 1914B operates as an adjustment mechanism for fixing a radius of cutting assembly 1902B by securing a proximate end of arm 1916B to angled connector 1912B using one of a plurality of spaced apart apertures along the length of arm 1916B. A rotatable, non-motorized cutting blade is supported at the distal end of arm 1916B along with a blade guard 1920B.

Figure 21:
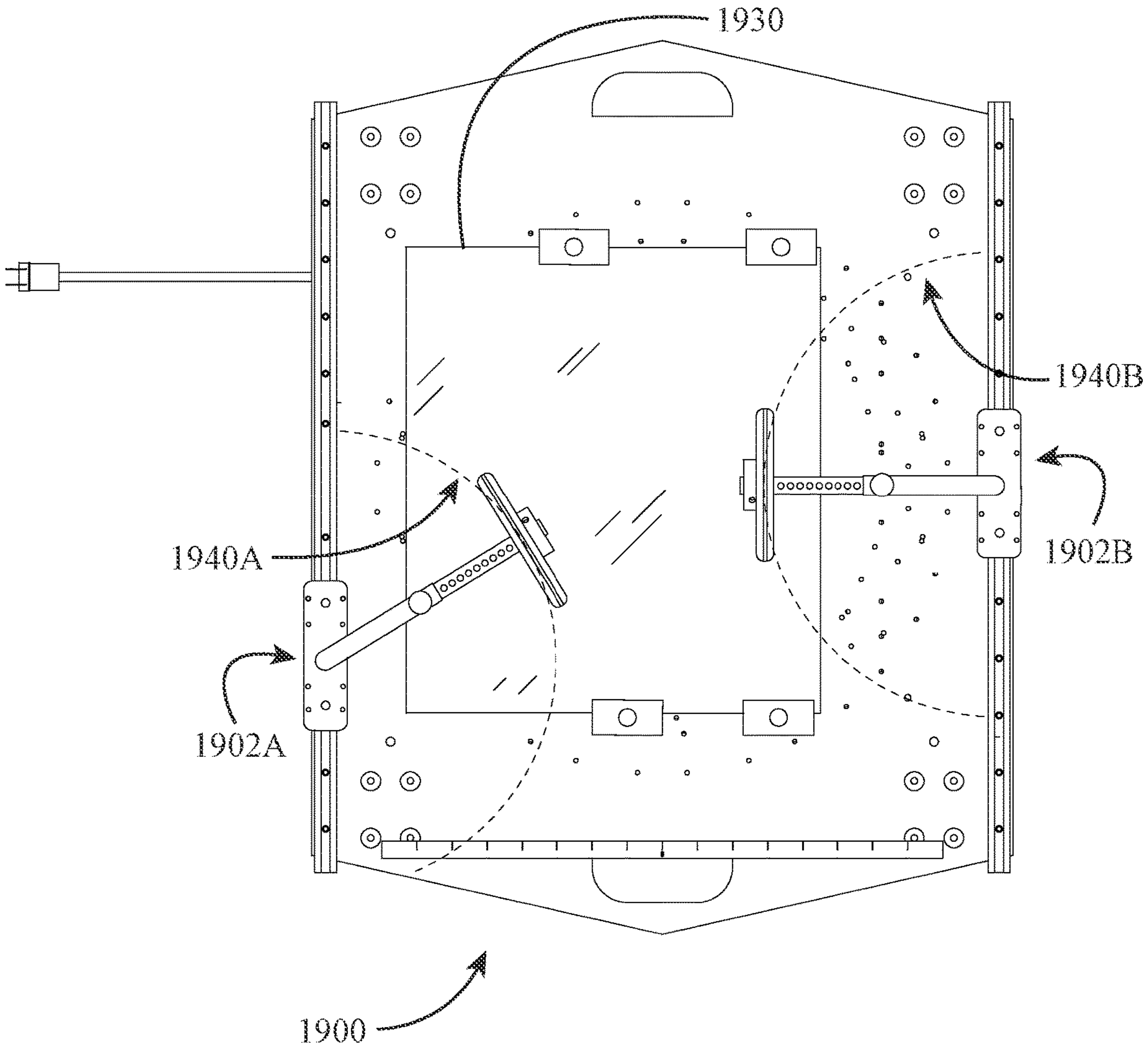
FIG. 21 is a top plan view of the second example tile cutting device illustrating two independently configurable arc cutting blades.

Referring now to FIG. 21, there is shown a top plan view of the second example tile cutting device illustrating the operation of the two independently configurable cutting assemblies 1902A and 1902B. As shown, cutting assembly 1902A will cut tile 1930 along arc 1940A, and cutting assembly 1902B will cut tile 1930 along arc 1940B. Arcs 1940A and 1940B have equal radii because cutting assemblies 1902A and 1902B are similarly configured.

Figure 22:
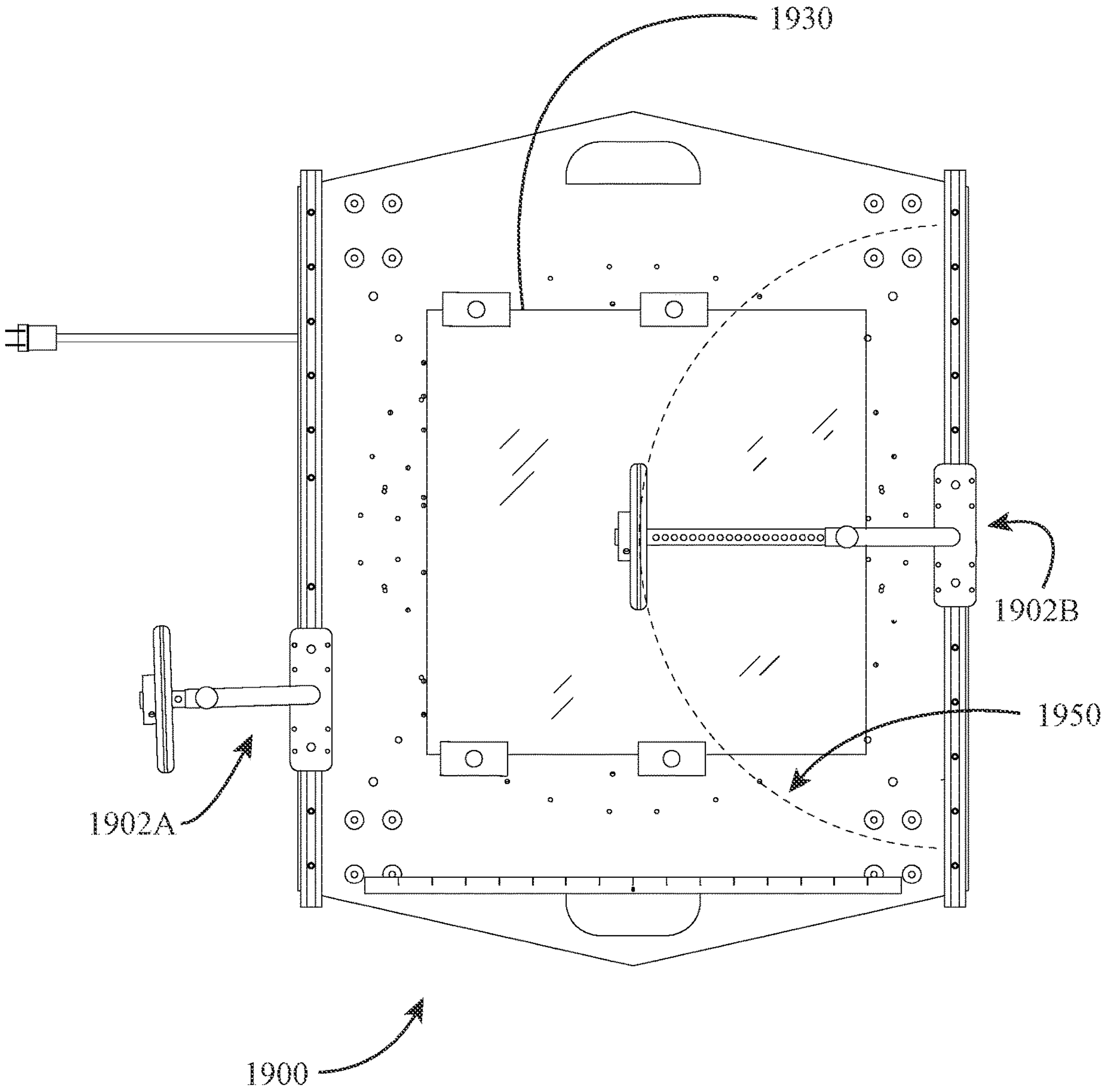
FIG. 22 is a top plan view of the second example tile cutting device illustrating operation using a single configurable arc cutting blade.

FIG. 22 is a top plan view of the second example tile cutting device 1900 illustrating operation using a single cutting assembly 1902B. As illustrated, cutting assembly 1902B will cause tile 1930 to be cut along arc 1950. Cutting assembly 1902A has been rotated into a non-operative position.

Figure 23:
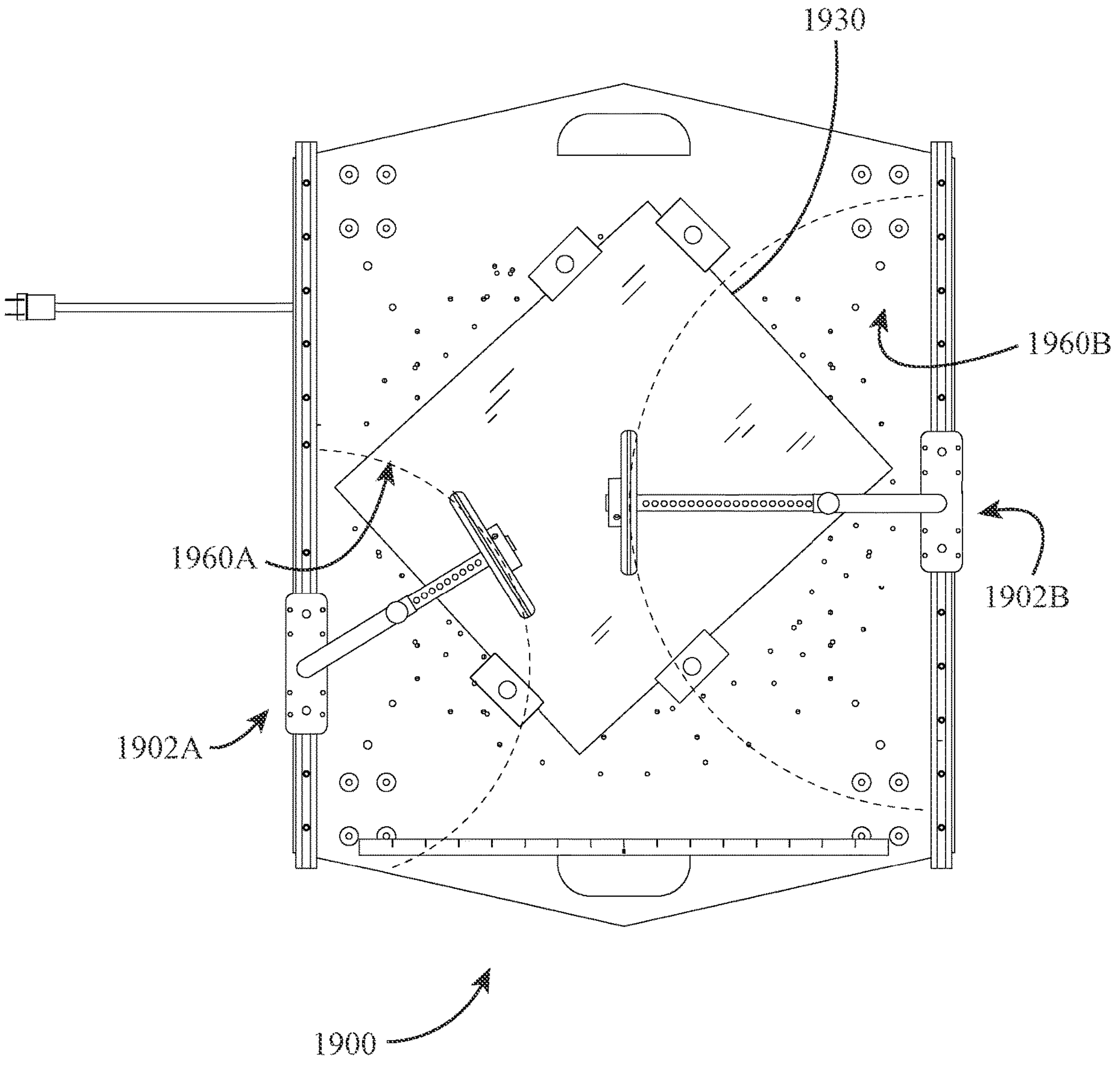
FIG. 23 is a top plan view of the second example tile cutting device illustrating operation using two independently configurable arc cutting blades with different radii.

FIG. 23 is a top plan view of the second example tile cutting device 1902B configured such that cutting assemblies 1902A and 1902B are adjusted to cut arcs 1960A and 1960B, respectively, having different radii.

Figure 24A:
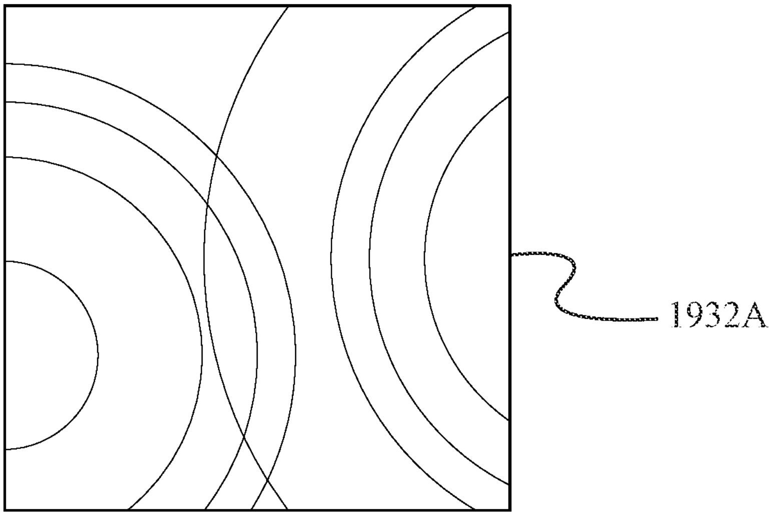
FIG. 24A is a top plan view of a tile showing proposed cutting arcs having various radii.
Figure 24B:
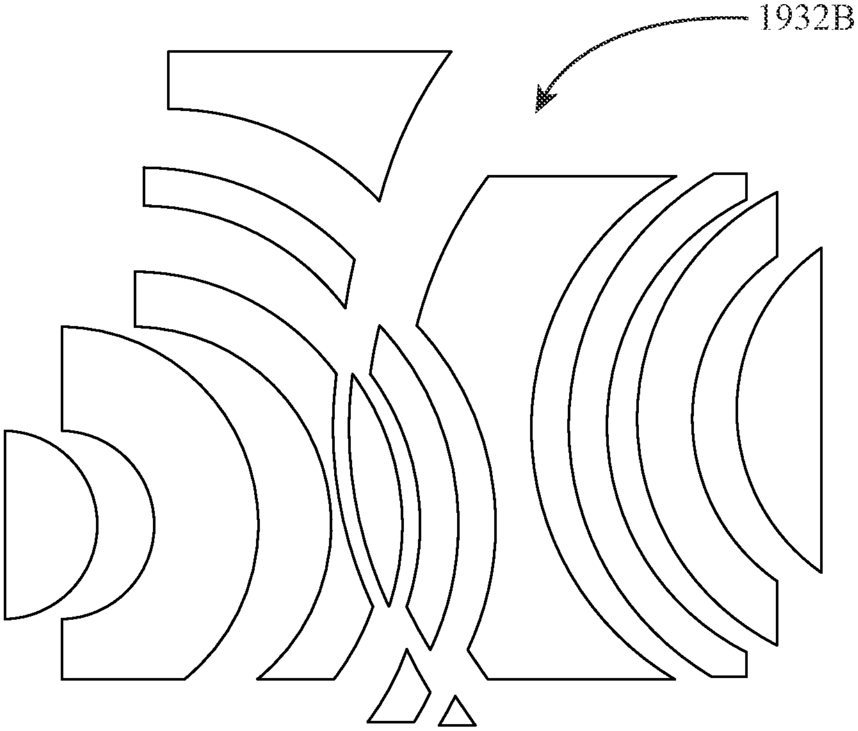
FIG. 24B is a top plan view of a plurality of tile portions cut from the tile of FIG. 24A.

FIG. 24A is a top plan view of an example tile 1932A showing a plurality of proposed cutting arcs having various radii. FIG. 24B is a top plan view of a plurality of tile portions 1932B cut from tile 1932 in accordance with the proposed cutting arcs shown in FIG. 24A.

While the devices, systems, methods, and so on have been illustrated by describing examples, and while the examples have been described in considerable detail, it is not the intention of the applicant to restrict, or in any way, limit the scope of the appended claims to such detail. It is, of course, not possible to describe every conceivable combination of components or methodologies for purposes of describing the devices, systems, methods, and so on provided herein. Additional advantages and modifications will readily appear to those skilled in the art. Therefore, the invention, in its broader aspects, is not limited to the specific details and illustrative examples shown and described. Accordingly, departures may be made from such details without departing from the spirit or scope of the applicant's general inventive concept. Thus, this application is intended to embrace alterations, modifications, and variations that fall within the scope of the appended claims. The preceding description is not meant to limit the scope of the invention. Rather, the scope of the invention is to be determined by the appended claims and their equivalents.

Finally, to the extent that the term "includes" or "including" is employed in the detailed description or the claims, it is intended to be inclusive in a manner similar to the term "comprising," as that term is interpreted when employed as a transitional word in a claim. Furthermore, to the extent that the term "or" is employed in the claims (e.g., A or B) it is intended to mean "A or B or both." When the applicants intend to indicate "only A or B, but not both," then the term "only A or B but not both" will be employed. Similarly, when the applicants intend to indicate "one and only one" of A, B, or C, the applicants will employ the phrase "one and only one." Thus, use of the term "or" herein is the inclusive, and not the exclusive use. See Bryan A. Garner, A Dictionary of Modern Legal Usage 624 (2*d*. Ed. 1995).

What is claimed is:

1. A vinyl tile cutting device configured to cut vinyl tiles along an arc, said vinyl tile cutting device comprising:

a base element, said base element comprising a first side and a second side and said base element being conductive and configured to support a vinyl tile thereon during a cutting process;

a first articulated arm comprising a first end and a second end, the first end being positionable along the first side of the base in a first configuration, the first end being maintained in a fixed position relative to the base in a second configuration, the first articulated arm configured to rotate about the first end in the second configuration;

A first cutting assembly fixedly disposed at the second end of the first articulated arm above said base element, said first cutting assembly comprising a first non-motorized, toothless, rotatable cutting blade, a rotational axis of the first cutting blade being substantially parallel to a longitudinal axis of the first articulated arm, the first cutting blade operative to cut said vinyl tile in a curved first cutting path when the first articulated arm is rotated about the first end; and a heating element disposed beneath said base element and substantially spanning the first cutting path of said first cutting assembly, said heating element configured to adjustably heat the first cutting path of said vinyl tile prior to and contemporaneous with the cutting of said vinyl tile.

2. The vinyl tile cutting device according to claim 1, wherein said vinyl tile cutting device comprises a second cutting assembly comprising second non-motorized, toothless, rotatable cutting blade for cutting said vinyl tile along a second curved cutting path.

3. The vinyl tile cutting device according to claim 2, wherein said base element comprises a pair of spaced-apart rails, namely a first rail and a second rail, for supporting said cutting assemblies.

4. The vinyl tile cutting device according to claim 3, wherein the first cutting assembly further comprises a first rail guide which engages the first rail, the first rail guide supporting the first articulated arm which supports the first cutting blade, the first articulated arm configured to rotate with respect to the first rail guide.

5. The vinyl tile cutting device according to claim 4 wherein the first articulated arm comprises a first adjustment mechanism operative to change a radius of the first cutting path.

6. The vinyl tile cutting device according to claim 4 wherein the second articulated arm comprises a second adjustment mechanism operative to change a radius of the second cutting path.

7. The vinyl tile cutting device according to claim 3, wherein the second cutting assembly further comprises a second rail guide which engages the second rail, the second rail guide supporting the second articulated arm which supports the second cutting blade, the second articulated arm configured to rotate with respect to the second rail guide.

8. The vinyl tile cutting device according to claim 1, wherein said first cutting assembly further includes a first safety cover disposed over at least a portion of said first cutting blade so as to protect a user of said tile cutting device from being inadvertently cut by said first cutting blade.

9. The vinyl tile cutting device according to claim 1, wherein said base element includes one or more securing elements for holding said tile in place relative to said base element.

10. The vinyl tile cutting device according to claim 1, wherein said second cutting assembly further includes a second safety cover disposed over at least a portion of said second cutting blade so as to protect a user of said tile cutting device from being inadvertently cut by said second cutting blade.

11. A vinyl tile cutting device configured to cut arcs in vinyl tiles, said vinyl tile cutting device comprising:

a base element, said base element being conductive and configured to support a vinyl tile thereon during a cutting process, said base element comprising a pair of parallel, spaced-apart rails namely a first rail and a second rail, fixed in relation to the base element;

a first cutting assembly disposed above said base element, the first cutting assembly comprising a first rail guide, the first rail guide engaging the first rail, the first rail guide supporting a first articulated arm which supports a first cutting blade, the first cutting blade is fixedly attached to one end the first articulated arm such that a rotational axis of the first cutting blade is substantially parallel to a longitudinal axis of the first articulated arm, the first articulated arm configured to rotate with respect to the first rail guide;

a second cutting assembly disposed above said base element, the second cutting assembly comprising a second rail guide, the second rail guide engaging the second rail, the second rail guide supporting a second articulated arm which supports a first cutting blade, the second cutting blade is fixedly attached to one end the first articulated arm such that a rotational axis of the second cutting blade is substantially parallel to a longitudinal axis of the second articulated arm, the second articulated arm configured to rotate with respect to the second rail guide; and a heating element disposed beneath said base element and substantially spanning a cutting path of each cutting assembly, said heating element configured to adjustably heat the cutting paths of said vinyl tile prior to and contemporaneous with the cutting of said vinyl tile.

12. The vinyl tile cutting device according to claim 11, wherein the first cutting assembly further includes a first safety cover disposed over at least a portion of the first cutting blade so as to protect a user of said tile cutting device from being inadvertently cut by said first cutting blade.

13. The vinyl tile cutting device according to claim 11, wherein said base element includes one or more securing elements for holding said tile in place relative to said base element.

14. The vinyl tile cutting device according to claim 11 wherein the first articulated arm comprises a first adjustment mechanism operative to change a radius of a respective cutting path of the first cutting assembly.

15. The vinyl tile cutting device according to claim 11, wherein the second assembly further includes a second safety cover disposed over at least a portion of the second cutting blade so as to protect a user of said tile cutting device from being inadvertently cut by said second cutting blade.

16. The vinyl tile cutting device according to claim 11 wherein the first articulated arm comprises a second adjustment mechanism operative to change a radius of a respective cutting path of the second cutting assembly.

* * * * *